Aug. 12, 1930. J. F. HASTEDT 1,772,995
MACHINE FOR MAKING DOUGH WARE
Filed June 17, 1929
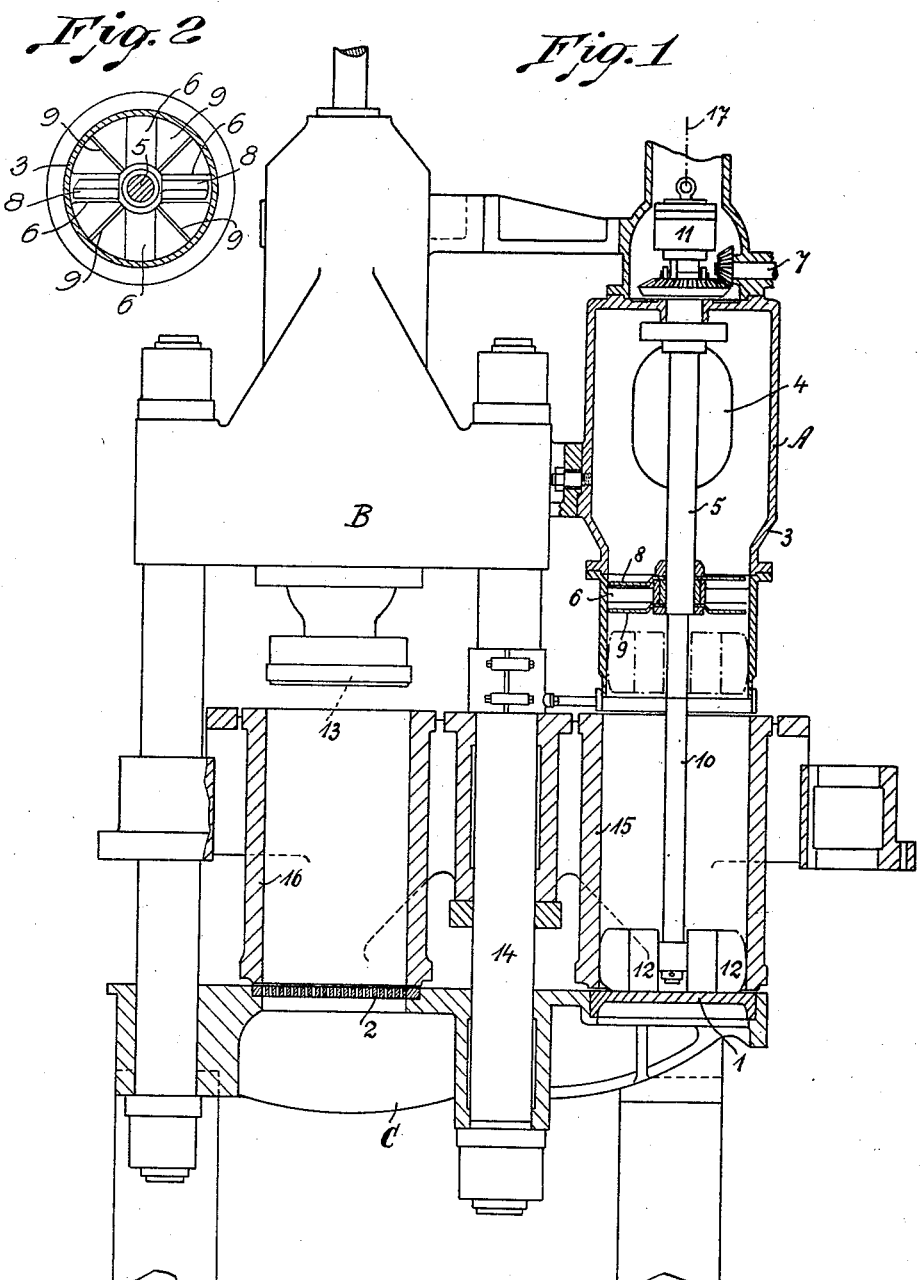

Patented Aug. 12, 1930

1,772,995

UNITED STATES PATENT OFFICE

JOHANN FRIEDRICH HASTEDT, OF BUXTEHUDE, GERMANY

MACHINE FOR MAKING DOUGH WARE

Application filed June 17, 1929. Serial No. 371,620.

This invention refers to a machine for producing or making dough- or paste-ware, particularly spaghetti, vermicelli, macaroni, noodles or other small paste, by which dough is treated after being produced up to the discharge of the dough-ware. By this machine the dough fed into the apparatus is kneaded, desintegrated into fine dough cuttings, and the dough cuttings are rolled together to form blocks free from air, and finally these blocks are worked into the desired dough-ware.

The machine consists therefore of the combination of a dough treating apparatus (kneading, desintegrating, rolling) with an apparatus for working up such treated dough (a press for producing dough-ware). For the combination of these two apparatus two open cylinders connected to form a unit are used, one cylinder to be used in connection with the dough treating apparatus to produce a dough block free from air, and the other cylinder to be used in connection with the press piston adapted to enter this cylinder for producing the ware desired. The unit formed by the two cylinders is arranged to rotate about a vertical axis in line with the center line of a table arranged below and comprising the bottoms of the two apparatus. The said unit will be adjusted in such manner that when one cylinder forms part of the dough treating apparatus, the other is in such position as to form part of the press. When the unit of the two cylinders is rotated for 180° the two cylinders are interchanged.

The bottom of the dough treating apparatus is imperforated, while the bottom of the press is constructed as a knife plate, or it is perforated either by small perforations or by slots. When in the dough treating apparatus the dough is compressed to form a block, and when thereupon the device for forming the block is withdrawn from the cylinder and the cylinder unit is rotated for 180°, the block is carried round by the said cylinder into a position below the piston of the press, whereupon the piston is operated to enter the said cylinder and to press the dough out through the knife- or perforated bottom to produce the desired ware, while the other cylinder being empty is brought into position below the dough treating machine to produce a new block of dough free from air.

By the alternative use of each cylinder for the production of a block and for making the dough-ware the efficiency is very much increased.

In the drawings, Figure 1 is a part elevational and part sectional view of the device;

Figure 2 is a horizontal sectional view taken directly above the knives 8 in Figure 1; and Figure 3 is a horizontal sectional view through the cylinder 15 showing the edge rolls.

The dough treating apparatus A and the dough press B are firmly connected with one another. The two bottoms of the apparatus A and B are combined with one another to form a common table C, which is firmly connected with the dough treating apparatus and the dough press in such way that the solid or imperforated bottom 1 is situated below the dough treating apparatus A and the perforated bottom or knife bottom 2 below the dough press for producing thin dough cuttings or thin dough strips.

The dough treating apparatus A is provided with a vertical cylindrical or funnel-like head 3 having feed openings 4 for introducing the dough to be treated. Within the head 3 a hollow shaft 5 is vertically journaled at its upper end by the top plate of the head and at its lower end by a spider 6. By a suitable gearing this hollow shaft 5 is driven from the horizontal shaft 7. Knives or arms 8 or 9 respectively are attached to the hollow shaft 5 above and below the spider 6. The arms of the spider 6 act as counter knives, so that by the knives 8 and 9 the dough moving downwardly is cut up into narrow pieces or cuttings.

Into the hollow shaft 5 the shaft 10 telescopes which is so shaped that it must rotate together with the shaft and is loaded by a special weight 11. At the lower end of the shaft 10 on lateral studs 2' rollers 12 are journaled forming edge rolls, and at the upper end a chain, rod or rope 17 is attached to the shaft 10, so as to enable the shaft 10 to be raised together with the edge rolls 12 to such an extent that the rolls 12 are lifted above the cylinder 15, as is indicated by dotted lines.

The dough press B is provided with a piston 13 adapted to enter the cylinder 16, which is connected with the cylinder 15 by any suitable connecting means to form a unit. In the position shown the cylinder 16 may be said to form part of the dough press, and the cylinder 15 may be said to form part of the dough treating apparatus. The unit formed by the two cylinders is adapted to rotate about a spindle 14 mounted vertically in the center of the table C. By rotating the unit formed by the two cylinders 15 and 16 and their connection about the spindle 14 for 180° the two cylinders can be interchanged. When the cylinder 15 is adjusted to stand below the head 3, the cylinder 16 is in position to allow the piston to enter therein.

The operation of the machine is as follows:
The shaft 10 is first lowered to such an extent within the cylinder that the edge rolls 12 rest on the bottom 1. The dough then fed by the opening 4 will be cut into thin slices or pieces by the knives 8 and 9 and the spider 6. The cuttings fall down into the cylinder 15, and, on the shaft 10 being rotated in unison with the hollow shaft 5, the cuttings will be kneaded and compressed by the weighted rollers 12 against the bottom 1, so that by and by a block of dough devoid of air will be formed increased in height during the continued rotation of the shaft 10, the rollers being gradually raised according to the increasing height of the dough block.

When the block has almost attained the height of the cylinder 15 the shaft 10 is raised to such an extent, that the edge rolls 12 fully enter the head 3. Thereupon the cylinders 15 and 16 are rotated about the spindle 14 until the cylinder 15 is now below the piston 13 centrally to the knife- or perforated bottom 2. By allowing the piston 13 to move downwardly into the cylinder the dough is pressed out through the knife bottom 2 forming thread-like dough strips. While the piston 13 is thus pressing downwardly the edge rolls 12 in the other cylinder will form a new block of dough.

I claim:—

1. A machine for making dough ware comprising a dough treating device, a dough press, a table having an imperforate bottom for the dough treating device and a perforated bottom for the dough press, means to connect the said dough treating device, the said press and the said table, two cylinders connected with one another to form a unit rotatably journalled about an axis centrally upon said table in such manner that the two cylinders are adapted to be adjusted alternatively so that when one cylinder is adjusted for the dough treating device the other is located under the dough press, said dough treating device comprising a reciprocating shaft, edge rolls mounted upon the end of said shaft, means for inserting said rolls and shaft into a cylinder adjusted thereunder and for withdrawing the same therefrom and means to rotate said shaft when projecting into said cylinder.

2. A machine for making dough ware comprising a dough treating device, a dough press, a table having an imperforate bottom for the dough treating device and a perforated bottom for the dough press, means to connect the said dough treating device, the said press and the said table, two cylinders connected with one another to form a unit rotatably journalled about an axis centrally upon said table in such manner that the two cylinders are adapted to be adjusted alternatively so that when one cylinder is adjusted for the dough treating device the other is located under the dough press, said dough treating device comprising a reciprocating shaft and edge rolls mounted upon the end of said shaft, means for inserting said rolls and shaft into a cylinder adjusted thereunder and for withdrawing the same therefrom, means to rotate said shaft when projecting within said cylinder, said means consisting of the hollow rotatable shaft into which said first named reciprocating shaft telescopes and cutting means attached to said hollow shaft adapted to cut the dough into small particles.

In testimony whereof I have signed my name to this specification.

JOHANN FRIEDRICH HASTEDT.